US006941500B2

(12) United States Patent
Harris et al.

(10) Patent No.: US 6,941,500 B2
(45) Date of Patent: Sep. 6, 2005

(54) METHOD FOR IMPLEMENTING A MODIFIED RADIO LINK PROTOCOL

(75) Inventors: John M. Harris, Chicago, IL (US); Robert D. Battin, Klideer, IL (US); Ajoy Singh, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 512 days.

(21) Appl. No.: 09/928,076

(22) Filed: Aug. 10, 2001

(65) Prior Publication Data

US 2003/0033568 A1 Feb. 13, 2003

(51) Int. Cl.⁷ .................................................. H04L 1/18
(52) U.S. Cl. ........................ 714/748; 714/749; 714/811
(58) Field of Search ................................ 714/748–749, 714/811

(56) References Cited

U.S. PATENT DOCUMENTS 6,011,796 A * 1/2000 Rezaiifar et al. ........... 370/394

FOREIGN PATENT DOCUMENTS

WO    WO 98/42108 A1    9/1998
WO    WO 9959299 A1 * 11/1999 ........... H04L/12/56

OTHER PUBLICATIONS

Xylomenos, G. et al.; Internet Wireless Link Performance; Aug. 1, 1998; Computer Systems Laboratory, Department of Computer Science Engineering, University of California San Diego, La Jolla California; pp. 1–26.*
Telecommunications Industry Association / Electronic Industry Alliance Interim Standard : "Data Service Options for Spread Spectrum Systems" TIZ/EIA/IS–707–A–2, Mar. 2001, pp 1–129.

* cited by examiner

Primary Examiner—R. Stephen Dildine
(74) Attorney, Agent, or Firm—Lalita W. Pace; Latonia H. Gordon

(57) ABSTRACT

A method of performing a modified RLP that reduces the transmission delay in a communications system by detecting frame erasures when they occur. The modified RLP method requests retransmission of erased frames based on pattern violations instead of sequence number violations. The method is preconditioned to expect a particular repeating pattern of frame delivery. For a system running a VSELP vocoder, the method in a receiving device expects to receive full rate or data (F) and DTX (D) frames in a repeating pattern FFDFFDFFD. For a system running an AMBE vocoder, the method in a receiving device expects to receive frames in a repeating pattern DFDFDFDD. The method detects when the pattern is violated and in desired instances immediately requests retransmission of the expected frame.

17 Claims, 3 Drawing Sheets

US 6,941,500 B2

METHOD FOR IMPLEMENTING A MODIFIED RADIO LINK PROTOCOL

FIELD OF THE INVENTION

The present invention relates generally to the field of communication systems, and more particularly, to a method for implementing a modified Radio Link Protocol (RLP), which determines data erasures, based on pattern violations.

BACKGROUND OF THE INVENTION

Recently, it has been proposed to add dispatch capabilities to the cdma2000 system. Unlike the interconnect services provided by today's cellular systems, dispatch services have been traditionally provided by two-way radio systems. Such services allow a user to communicate in ways that are difficult or costly using today's cellular systems. The dispatch group call service, for example, enables a user to communicate with one person or a group of people simultaneously and instantaneously, usually just by depressing a push-to-talk (PTT) button. Using a traditional cellular system, such a call could not occur instantaneously because telephone numbers would need to be dialed for a three-way call or arrangements would need to be made to set up a conference call.

Likewise, the dispatch individual call service enables a user to communicate with another user quickly and spontaneously. This feature is ideal for two people who are working together but are unable to speak with one another directly such as two people working in concert but in different locations in a building. Whereas a wireless telephone call is more appropriate for a conversation, communication between two people as they work is better facilitated by the dispatch individual service.

Dispatch private and group calls are low cost alternatives to interconnect calls. Dispatch voice is being targeted for transmission using radio link protocol (RLP) to take advantage of increased capacity due to increased frame error rate (FER) which is tolerable when one uses retransmissions. Currently, RLP running at a sending device, such as a mobile station, attaches a sequence number to a frame before it is transmitted to a receiving device, such as a base station controller (BSC). The sequence number is used by the RLP running at the receiving device to determine when a frame has been erased so that it can send an acknowledgement of the erasure (or a Negative Acknowledgement (NAK) of the frame erased) to the sending device. Upon receiving the acknowledgment or NAK, the sending device generally retransmits the frame. However, if the sender has discarded the retransmission due to a memory limitation, no retransmissions occur. Other exceptions could also exist.

U.S. Pat. No. 6,169,732 issued on Jan. 2, 2001 to Hetherington et al. and assigned to Motorola, Inc., discloses a method and apparatus in which a communication link between a first and second mobile communication resources is established via a series of land-based communication resources. The first mobile communication resource transmits, in sequence, sequentially numbered packets of data via the first wireless connection to a first land-based communication resource for subsequent transmission to the second mobile communication resource via the communication link. A detecting communication resource detects reception of out of sequence packets of data received at a receiving portion of its transceiver section and requests retransmission of the missing packets. For example, if the first mobile communication resource transmits frames 1, 2, 3 and 4, then upon detecting that frame 3 is missing, the first land-based communication resource requests retransmission of the missing frame 3. Thus, in current RLP, detection of an erased frame is delayed by at least one frame. This approach causes delay in requesting retransmission of erased frames.

Thus, there is a need for a modified RLP capable of detecting frame erasures closer in time to when they occur to decrease the delay in requesting retransmission of erased frames.

DETAILED DESCRIPTION OF THE DRAWINGS

The present invention provides a method of performing a modified RLP that reduces the transmission delay in a communications system by detecting frame erasures when they occur. In particular, the invention provides a modified RLP that requests retransmission of erased frames based on pattern violations instead of sequence number violations. The invention is described with respect to transmitting and receiving frames. It should be recognized by one of ordinary skill in the art that the invention is equally applicable to the transmission and reception of packets. In the preferred embodiment, the modified RLP method of the present invention is preconditioned to expect a particular repeating pattern of frame delivery. For a system running a VSELP vocoder on a 9.6 kbps dedicated control channel (DCCH), the method in a receiving device expects to receive full rate data (F) and DTX (D) frames in a repeating pattern FFDFFFD-FFD. For a system running an AMBE vocoder on a DCCH, the method in a receiving device expects to receive frames in a repeating pattern FDFDFDFDD. It will be recognized by one of ordinary skill in the art that the method of the present invention is also applicable to a system running a different vocoder on a different channel, and that a different channel may produce a different pattern. The modified RLP method of the present invention detects when the pattern is violated and more quickly requests retransmission of the expected frame.

Figure 1:
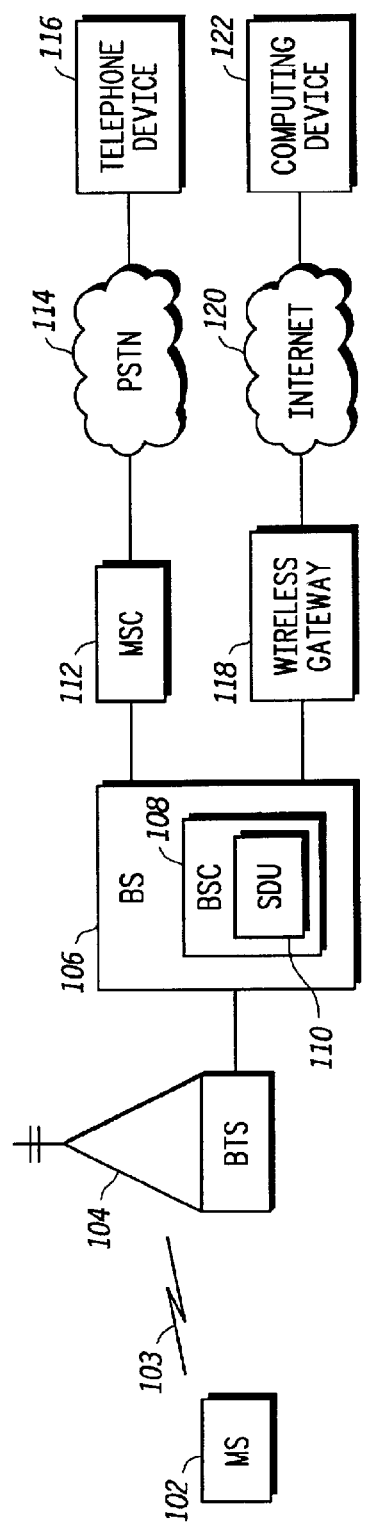
FIG. 1 is a block diagram of a first embodiment of a system architecture that can be used to implement the modified RLP method of the present invention.

FIG. 1 is a block diagram of a first embodiment of a system architecture that can be used to implement the preferred embodiment of the present invention. The architecture includes a mobile station (MS) 102 in wireless communication with a base transceiver station (BTS) 104. It should be recognized by one of ordinary skill in the art that there may be multiple BTSs in the system. The MS 102 implements the application used to generate and/or process data being transported within the system. The BTS 104 performs the standard radio transceiver functions, such as coding and modulation, for the air interface 103. The BTS 104 is coupled to a Base System (BS) 106, which includes a Base Station Controller (BSC) 108 and a Selection-Distribution Unit (SDU) 110. The BSC 108 implements the fixed side of signaling and control for the air interface 103. The SDU 110 selects the best received radio frame for the up-link portion of the air interface 103 and distributes the radio frame to the appropriate BTS for the downlink portion of the air interface 103.

The BS 106 is coupled to a Mobile Switching Center (MSC) 112, which acts as the interface between the cellular system and a PSTN 114. The PSTN 114 is coupled to a telephone device 116, which is typically an analog phone. The BS 106 is also coupled to a Wireless Gateway 118, which interfaces the Internet 120 to the cellular system. The Internet 120 is coupled to a computing device 122 that contains an application to which the MS 102 based application wishes to communicate with. Any telephone device 116 and computing device 122 having a vocoder corresponding to that used in the MS 102 may be used with the present invention.

Figure 2:
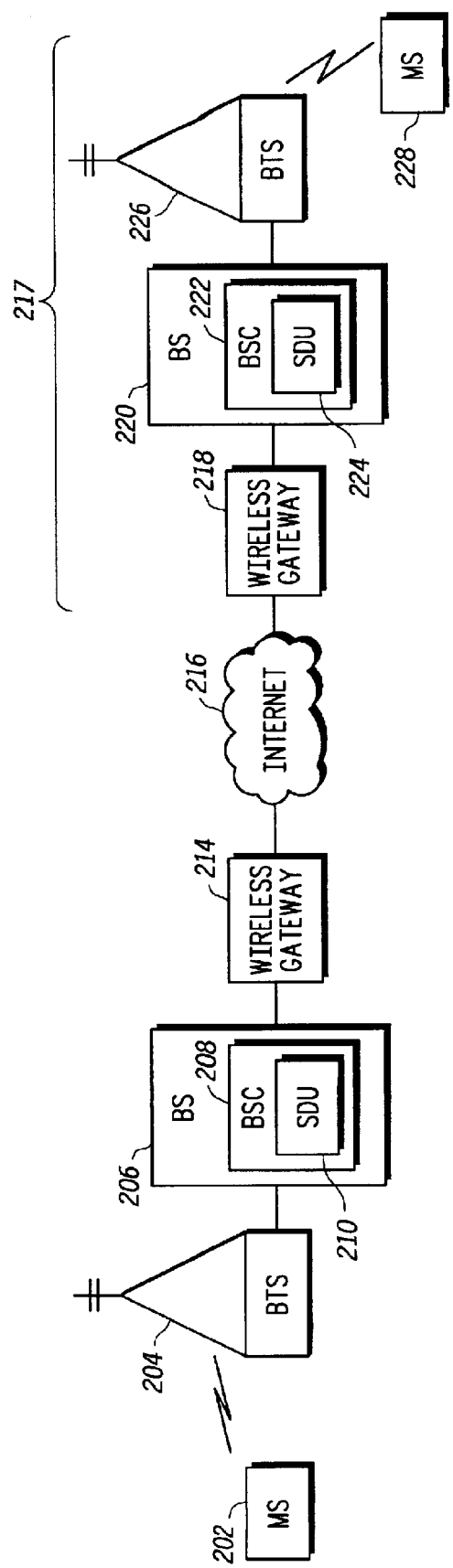
FIG. 2 is a block diagram of a second embodiment of a system architecture that can be used to implement the modified RLP method of the present invention.

FIG. 2 is a block diagram of a second embodiment of a system architecture that can be used to implement the preferred embodiment of the present invention. As shown, the system includes a MS 202 in wireless communication with a BTS 204. The BTS 204 is coupled to a BS 206 which includes a BSC 208 and an SDU 210. The BS 206 is coupled to a Wireless Gateway 214, which interfaces with the Internet 216. The second half of the system designated generally by 217 is a mirror image of the first half. As shown, the second half of the system includes a Wireless Gateway 218 coupled between the Internet 216 and the BS 220, which includes a BSC 222 and SDU 224. The BS 220 is also coupled to a BTS 226. The BTS 226 is coupled via wireless connection to a MS 228. The components shown in FIG. 2 perform the same functions as described with reference to FIG. 1.

Any MS 102, 202, 228 running RLP, such as the Motorola StarTAC®, can be used with the present invention. A BTS 104, 204, 226 that can be used with the present invention is model no. SC4812ET available from Motorola, Inc. An SDU 110, 210, 224 that can be used with the present invention comprises Motorola model numbers STLN1209, SGLN5826, STLN4382, STLN4405, SGLN2859, SGLN1857, SGLN5921 and SGLN5926. A MSC 112 that can be used with the present invention is model no. DMSMTX available from Nortel, Inc. A Wireless Gateway 118, 214, 218 that can be used with the present invention is model no. 7206VXR available from Cisco.

Figure 3:
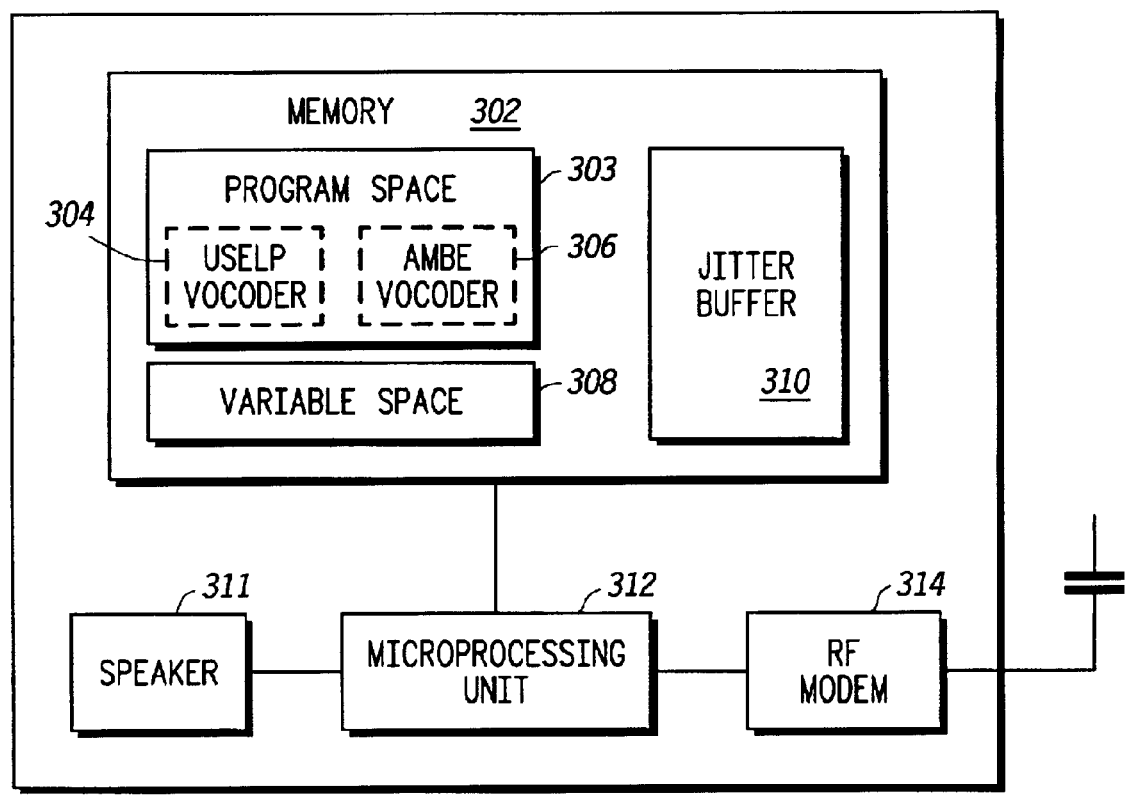
FIG. 3 is a block diagram of the preferred embodiment of the mobile station shown in FIGS. 1 and 2.

FIG. 3 is a block diagram of the preferred embodiment of the MS 102, 202, 228 shown in FIGS. 1 and 2. As shown, the MS 102, 202, 228 includes a memory 302 coupled to a microprocessing unit 312, which in turn is coupled to a speaker 311 and a radio frequency (RF) modem 314. The memory 302 includes a program space 303, a variable space 308 and a jitter buffer 310. The program space 303 is the portion of memory used to store computer programs for controlling the MS 102, 202, 228 and for processing information. The program space also includes the vocoder elements. In the preferred embodiment, the MS 102, 202, 228 includes a VSELP vocoder 304 and an AMBE vocoder 306. However, in other embodiments, the MS may include either a VSELP vocoder, an AMBE vocoder or a different type of vocoder altogether. The variable space 308 is the portion of memory used to store variables used by the computer programs. The jitter buffer 310 is the portion of memory used to compensate for delay variance or other network characteristics in the delivery of data. The jitter buffer 310 is also referred to as a resequencing buffer, fixed delay buffer, delay buffer and retransmission delay buffer. The microprocessing unit 312 contains the logic functionality for executing the computer instructions stored in the program space 303. The RF modem 314 performs the standard radio transceiver functions (coding, modulation, etc.) for the air interface. The speaker 311 outputs audio sound based on a stimulus.

The modified RLP of the present invention runs in the MS 102, 202, 228 and the SDU 110, 210, 224. In FIG. 1, the invention is used when frames of information are communicated between the MS 102 and SDU 110. In FIG. 2, the invention is used when frames of information are communicated between the MS 202 and SDU 210 and between the SDU 224 and MS 228. In the preferred embodiment of the modified RLP of the present invention, the MS 102, 202, 228 and SDU 110, 210, 224 transmitter and receiver are preconfigured to transmit or receive an Expected Frame Pattern (EFP). The EFP is composed of a repeating pattern of expected frame types. There are also both L3 Signaling, RLP Signaling and RLP Retransmission frame types, but these do not appear in the EFP. In the preferred embodiment, the EFP for a system running a VSELP vocoder is FFDFFDFFD and the EFP for a system running an AMBE vocoder is FDFDFDFDD.

The modified RLP method of the present invention also manages a second pattern, a Current Frame Pattern (CFP). The CFP is the expected frame pattern modified in time to reflect the frames actually received by the receiving device. In other words, the CFP will differ from the EFP when a frame other than that expected is received (such as when a Signaling or Retransmission frame is received).

When the receiving device (MS 102, 202, 228 or SDU 110, 210, 224) detects a frame erasure (i.e., when a DTX frame is received and a data frame was expected), it generates a Smart NAK for transmission to the sending device. A Smart NAK is sent as an RLP Control Message. In the preferred embodiment of the present invention, the CTL field is '1100 01' for a Smart NAK. However, other values may be used. A Smart NAK may be sent as NAK_TYPE '00' or '01.' The frame format is specified in Section 4.2.2 of TIA/EIA/IS-707-A-2 with an additional field, Smart_nak_value. TIA/EIA/IS707-A-2 is hereinafter referred to as IS-707-A-2. A copy of IS-707-A-2 may be obtained via a world wide web site located at www.tiaonline.org, or by writing to Telecommunications Industry Association, 1300 Pennsylvania Ave., Suite 350, Washington, D.C. 20004 USA. Smart_nak_value is a 12-bit field whose value is set to the expected SEQ of the frame being SMART NAKed. For example, assume the EFP is FFDF . . . and the first F is received with a SEQ of 0xa1 and a SEQ HI value of 0x01. If the next frame received is a D instead of an F as expected, a Smart Nak with Smart_nak_value of 0x1a2 would be generated. The Smart_nak_value is appended into the RLP control message after the NAK-TYPE dependent fields and prior to the padding and Frame Check Sequence (FCS).

Figure 4:
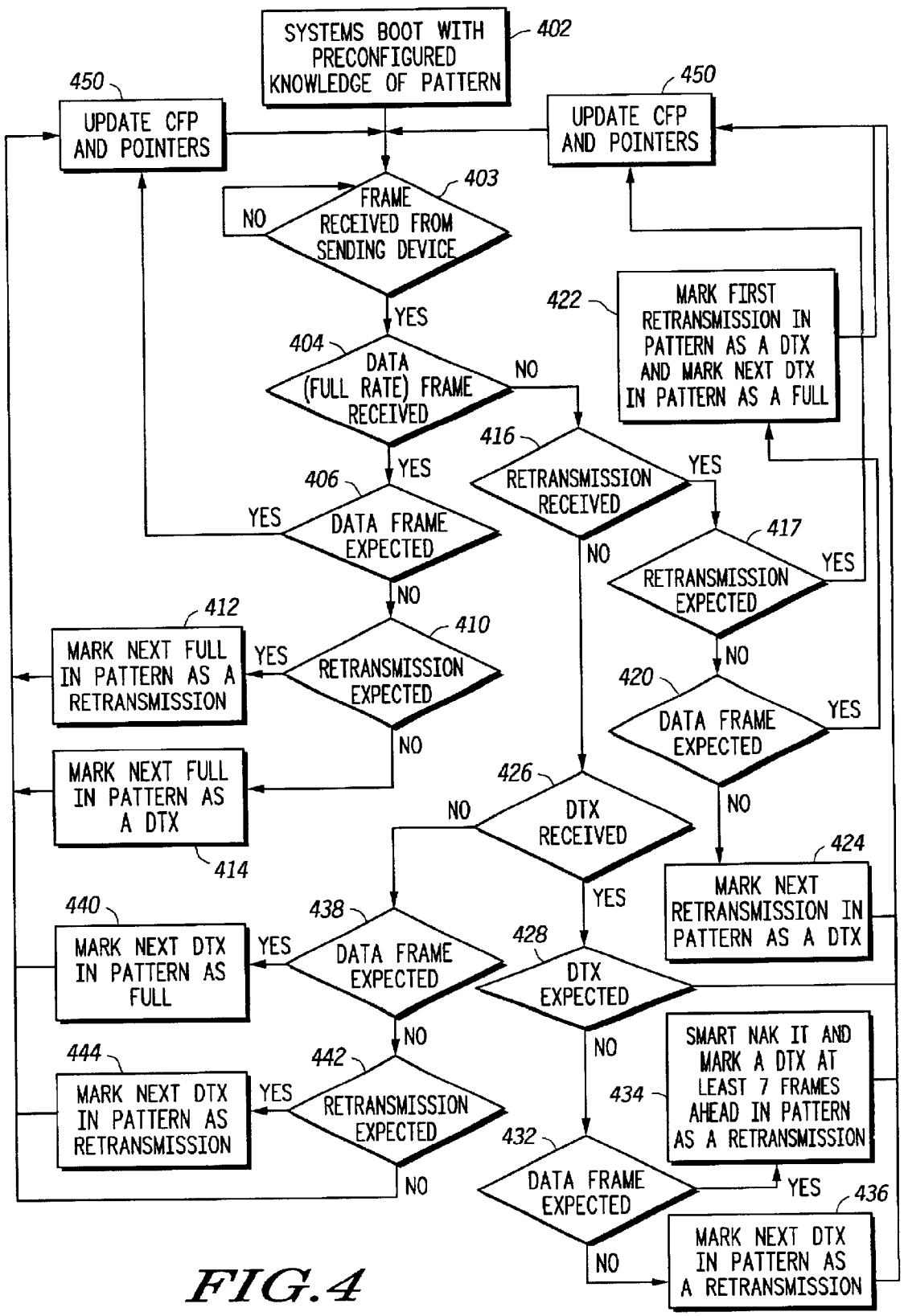
FIG. 4 is a flow chart of the preferred embodiment of the modified RLP method of the present invention.

Referring to the flowchart of FIG. 4, details of the invention will now be described. Preferably, at step 402, the systems (MS and SDU in communication) boot up with knowledge of the EFP to be communicated. In an alternate embodiment, the MS and SDU are informed via message of the type of vocoder that will be used and/or the EFP. In another embodiment, the MS and SDU may learn the EFP by observing the traffic stream. As mentioned earlier, if the MS 102, 202, 228 and SDU 110, 210, 224 run a VSELP vocoder, the EFP is a repetition of pattern FFDFFDFFD. For an AMBE vocoder, the EFP is a repetition of pattern FDFDFDFDD. At step 403, the method determines whether a frame was received from the sending device (MS or SDU). If a frame was received, at step 404, the method determines whether a data frame was received. If a data frame was received, at step 406 the method determines whether a data frame was expected. If a data frame was expected, the method updates the CFP and pointers (step 450) and checks for receipt of another frame (step 403). In the preferred embodiment, the CFP is updated by taking the first frame from the EFP and placing it at the end of the EFP, deleting the first frame in the CFP, and then adding a copy of the last frame of the EFP to the end of the CFP. If a data frame was not expected, at step 410, the method determines whether a Retransmission frame was expected. If a Retransmission frame was expected, the method marks the next full rate frame in the CFP as a Retransmission frame (step 412), updates the CFP and pointers (step 450)and checks for receipt of another frame (step 403). If a Retransmission frame was not expected, a DTX frame was expected. The method marks the next full rate frame in the CFP as a DTX frame (step 414), updates the CFP and pointers (step 450) and checks for receipt of another frame (step 403).

Referring back to step 404, if a data frame was not received, at step 416, the method determines whether a Retransmission frame was received. If a Retransmission frame was received, at step 417, the method determines whether a Retransmission frame was expected. If a Retransmission frame was expected, the method updates the CFP and pointers (step 450) and checks for receipt of another frame (step 403). If a Retransmission frame was not expected, the method determines whether a data frame was expected (step 420). If a data frame was expected, the method marks the first Retransmission in the CFP as a DTX, marks the next DTX in the CFP as a full rate frame (step 422), updates the CFP and pointers (step 450) and checks for receipt of another frame (step 403). If a data frame was not expected, a DTX frame was expected. The method marks the next Retransmission in the CFP as a DTX frame (step 424), updates the CFP and pointers (step 450) and checks for receipt of another frame (step 403).

Referring back to step 416, if a Retransmission was not received, the method determines whether a DTX frame was received (step 426). If a DTX frame was received, the method determines whether a DTX frame was expected (step 428). If a DTX frame was expected, the method checks for receipt of another frame (step 403). If a DTX frame was not expected, the method determines whether a data frame was expected (step 432). If a data frame was expected, the method sends a Smart NAK to the sending device and marks a DTX frame a predetermined number of frames ahead, preferably at least seven, in the CFP as a Retransmission frame (step 434). The Smart NAK serves as a request for retransmission of the missing (or erased) data frame. Next, the method checks for receipt of another frame (step 403). If a data frame was not expected, a Retransmission frame was expected. The method marks the next DTX frame in the CFP as a Retransmission frame (step 436) and checks for receipt of another frame (step 403).

Referring back to step 426, if a DTX frame was not received, a signaling frame was received. At step 438, the method determines whether a data frame was expected. If a data frame was expected, the method marks the next DTX frame in the CFP as a full rate frame (step 440) and checks for receipt of another frame (step 403). If a data frame was not expected, the method determines whether a Retransmission frame was expected (step 442). If a Retransmission frame was expected, the method marks the next DTX frame in the CFP as a Retransmission frame (step 444) and checks for receipt of another frame (step 403). If a Retransmission frame was not expected, a DTX frame was expected and the method checks for receipt of another frame (step 403).

For the purpose of illustrating the principles of the present invention and not intending to limit the invention in any way, assume MS 102 (FIG. 1) is running a VSELP vocoder and transmits an EFP-FFDFFDFFDFFDFFDFFD (the pattern for a VSELP vocoder repeated once) to SDU 110. The modified RLP method runs on both the sending device (MS 102) and receiving device (SDU 110). The modified RLP method running at the receiving device uses an expected frame pointer (EFPT) to point to the next frame in the EFP that will be added to the CFP and uses a current frame pointer (CFPT) to point to the frame in the CFP that is being operated on. For ease of illustration, the frame pointed to by the EFPT or CFPT is underlined. Referring to the flowchart of FIG. 4, at step 402, the MS 102 and SDU 110 boot with knowledge that the EFP is F̲FDFFDFFDFFDFFDFFD. Prior to any changes, the CFP is also F̲FDFFDFFDFFDFFDFFD. Initially the EFPT and CFPT point to the first frame in the respective patterns. For purposes of this example, assume that for the first six frames the actual pattern received is FSDDRF. At step 403, the method determines whether a frame was received from the MS 102. In this case, the first frame received is a data frame so at step 406, the method determines whether a data frame was expected. Because the first frame of the EFP is a data frame, the answer is yes. The method updates the CFP to be FDFFDFFDFFDFFDFFDF (step 450). At step 403, the method checks for receipt of another frame (step 403).

Next the SDU receives a signaling frame (S). Now the EFPT points to the second frame of the EFP-F F̲DFFDFFDFFDFFDFFD and the CFPT points to the first frame of the CFP-F̲DFFDFFDFFDFFDFFDF. At step 426 ("no" branch), the method determines that a signaling frame was received and determines that a data frame was expected (step 438). (The second frame of the EFP is a full frame.) At step 440, the method marks the next DTX in the CFP (second frame) as a full frame giving FFFFDFFDFFDFFD-FFD. The method updates the CFP to be FFFDFFDFFD-FFDFFDFF (step 450), the EFPT to be FF D̲FFDFFDFFDFFD and the CFPT to be F̲FFDFFDFFDFFDFFDFF. At step 403, the method checks for receipt of another frame.

The third frame received is a DTX frame. At step 426 ("yes" branch), the method determines that a DTX frame was received and then determines that a DTX frame was expected (step 428). Next, the method updates the CFP to be FFDFFDFFDFFDFFDFFD, the EFPT to point to the fourth frame in the EFP-FFDF̲FDFFDFFDFFDFFD and the CFPT to point to the first frame in the CFP-F̲FDFFDFFDFFDFFDFFD (step 450). Next, the method checks for receipt of another frame (step 403). The fourth frame received is a DTX frame. At step 426, the method determines that a DTX frame was received and at step 432 determines that a data frame was expected. The method generates a Smart Nak to the MS 102 and marks a DTX frame at least 7 frames into the CFP as a Retransmission (step 434). In the current CFP the first DTX 7 or more frames into the pattern is 8 frames into the pattern, producing a CFP of FFDFFDFFRFFDFFDFFD. The method updates the CFP to be FDFFDFFRFFDFFDFFDF, updates the EFPT to point to the fifth frame in the EFP-FFDFF̲DFFDFFDFFDFFD and updates the CFPT to point to the first frame in the CFP-F̲DFFDFFRFFDFFDFFDF (step 450). At step 403, the method again checks for receipt of another frame.

The fifth frame received is a Retransmission frame. At step 416, the method determines that a Retransmission frame was received, and at step 420 determines that a data frame was expected. At step 422, the method marks the first Retransmission frame in the CFP as a DTX frame and marks the next DTX frame in the CFP as a data frame. Now the CFP is FDFFDFFDFFFFFDFFDF. At step 450, the method updates the CFP to be DFFDFFDFFFFFDFFDFF, updates the EFPT to points to the sixth frame in the EFP-FFDFF DFFDFFDFFFDFFD and updates the CFPT to point to the first frame in the CFP-DFFDFFDFFFFFDFFDFF. At step 403, the method checks for receipt of another frame.

The sixth frame received is a data frame. At step 404, the method determines that a data frame was received and at step 410 ("no" branch) determines that a DTX frame was expected. At step 414, the method marks the next data frame in the CFP as a DTX. Now the CFP is DDFDFFDFFFFFD-FFDFF. At step 450, the method updates the CFP to be DFDFFDFFFFFDFFDFFD, updates the EFPT to point to the seventh frame in the EFP-FFDFFDFFDFFDFFDFFD and updates the CFPT to point to the first frame in the CFP-DFDFFDFFFFFDFFDFFD. At step 403, the method determines that no more frames have been received from the sending device.

Those skilled in the art will recognize that various modifications and variations can be made in the apparatus and method of the present invention and in construction of this apparatus without departing from the scope or spirit of this invention. For example, the modified RLP method of the present invention can also be applied to the fundamental channel (FCH) and secondary channel (SCH). In such cases, additional frame types beyond Full, Signaling, Retransmisssion, and DTX may be received. The basic concept of the invention still applies.

What is claimed is:

1. A method for implementing a modified radio link protocol (RLP) in a mobile communications device, the method comprising the steps of:
   receiving a plurality of frames;
   maintaining a current frame pattern of expected frame types; and
   determining that a received frame of the plurality of frames violates a predetermined pattern of frames expected to be received based on the current frame pattern.

2. The method of claim 1 further comprising the step of communicating to a sending device that the received frame violates the predetermined pattern.

3. The method of claim 2 wherein the step of communicating comprises the step of generating a Smart NAK comprising a value corresponding to an expected sequence number of the received frame.

4. The method of claim 1 wherein the step of determining comprises the steps of:
   determining that the received frame of the plurality of frames is a DTX frame and a data frame was expected; and
   marking a next DTX frame a predetermined number of frames ahead in the current frame pattern as a Retransmission frame.

5. The method of claim 1 wherein the step of determining comprises the steps of:
   determining that the received frame of the plurality of frames is a Signaling frame and a data frame was expected; and
   marking a next DTX frame in the current frame pattern as a data frame.

6. The method of claim 1 wherein the step of determining comprises the steps of:
   determining that the received data frame of the plurality of data frames is a Signaling frame and a Retransmission frame was expected; and
   marking a next DTX frame in the current frame pattern as a Retransmission frame.

7. The method of claim 1 wherein the step of determining comprises the steps of:
   determining that the received data frame of the plurality of data frames is a Retransmission frame and a data frame was expected; and
   marking a first Retransmission frame in the current frame pattern as a DTX and marking a next DTX frame in the current frame pattern as a data frame.

8. The method of claim 1 wherein the step of determining comprises the steps of:
   determining that the received data frame of the plurality of data frames is a Retransmission frame and a DTX frame was expected; and
   marking a next Retransmission frame in the current frame pattern as a DTX frame.

9. The method of claim 1 wherein the step of determining comprises the steps of:
   determining that the received data frame of the plurality of data frames is a data frame and a DTX frame was expected; and
   marking a next data frame in the current frame pattern as a DTX frame.

10. The method of claim 1 wherein the step of determining comprises the steps of:
    determining that the received data frame of the plurality of data frames is a data frame and a Retransmission frame was expected; and
    marking a next data frame in the current frame pattern as a Retransmission frame.

11. The method of claim 1 wherein the step of determining comprises the steps of:
    determining that the received data frame of the plurality of data frames is a DTX frame and a Retransmission frame was expected; and
    marking a next DTX frame in the current frame pattern as a Retransmission frame.

12. The method of claim 1 wherein the predetermined pattern of frames is sent to the mobile communications device before the plurality of frames is received.

13. The method of claim 1 wherein the predetermined pattern of frames is learned by the mobile communications device by observing a traffic stream.

14. A method for implementing a modified radio link protocol (RLP) in an infrastructure equipment, the method comprising the steps of:
    receiving a plurality of frames;
    maintaining a current frame pattern of expected frame types; and
    determining that a received frame of the plurality of frames violates a predetermined pattern of frames expected to be received based on the current frame pattern.

15. The method of claim 14 further comprising the step of communicating that the received frame violates the predetermined pattern.

16. The method of claim 15 wherein the step of communicating comprises the step of generating a Smart NAK comprising a value corresponding to an expected sequence number of the received frame.

17. The method of claim 16 wherein the step of determining comprises the steps of:
    determining that the received frame of the plurality of frames is a DTX frame and a data frame was expected; and
    marking a different DTX frame a predetermined number of frames ahead in the current frame pattern as a Retransmission frame.

* * * * *